(12) United States Patent
Rittler

(10) Patent No.: US 12,716,475 B2
(45) Date of Patent: Aug. 25, 2026

(54) TRANSMISSION ARRANGEMENT AND DRIVE TRAIN WITH SUCH A TRANSMISSION ARRANGEMENT

(71) Applicant: ZF Friedrichshafen AG, Friedrichshafen (DE)

(72) Inventor: David Rittler, Neukirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/025,041

(22) Filed: Jan. 16, 2025

(65) Prior Publication Data

US 2025/0237295 A1 Jul. 24, 2025

(30) Foreign Application Priority Data

Jan. 19, 2024 (DE) ..................... 10 2024 200 485.5

(51) Int. Cl.
*F16H 37/08* (2006.01)
*B60K 17/16* (2006.01)
*F16H 57/04* (2010.01)

(52) U.S. Cl.
CPC ......... *F16H 37/0813* (2013.01); *B60K 17/16* (2013.01); *F16H 57/043* (2013.01); *F16H 57/0479* (2013.01); *F16H 57/042* (2013.01); *F16H 57/0483* (2013.01)

(58) Field of Classification Search
CPC ............... F16H 37/0813; F16H 37/043; F16H 37/0483; F16H 57/0479; F16H 57/042; F16H 57/037; F16H 57/082; F16H 48/08; F16H 2408/02–48/11; B60K 2001/001; B60K 17/04; B60K 17/16
See application file for complete search history.

(56) References Cited

U.S. PATENT DOCUMENTS 6,074,321 A * 6/2000 Maeda .................. B60K 17/04 475/221
2024/0229924 A1 7/2024 Greiter

FOREIGN PATENT DOCUMENTS

JP 2001-330111 A2 11/2001
JP 2018-189192 A2 11/2018
JP 2018-189193 A2 11/2018
(Continued)

OTHER PUBLICATIONS

German Patent Office, German Office Action issued in German Patent Application No. 10 2024 200 485.5 (Aug. 23. 2024).

*Primary Examiner* — Tinh T Dang
(74) *Attorney, Agent, or Firm* — Secant IP, PLLC

(57) ABSTRACT

A transmission arrangement for a vehicle drive train includes a planetary wheel set with a planetary carrier with at least one bolt. A first bearing element on the bolt is arranged for rotatably mounting a planetary wheel. The transmission arrangement also has a differential connected to the planetary carrier in a drive-effective manner and configured to transfer a drive power acting on the planetary carrier to a first center shaft and to a second center shaft arranged coaxially thereto, where at least the first center shaft defines a central first channel for the cooling and/or lubricant supply to an interior of the differential, and defining at least one first bore hole on the planetary carrier which extends radially at least in some sections and is configured to guide the coolant and/or lubricant out of the interior of the differential into a second channel of the bolt.

10 Claims, 2 Drawing Sheets

(56) References Cited

FOREIGN PATENT DOCUMENTS

| | | | |
|---|---|---|---|
| JP | 2023-152666 | A2 | 10/2023 |
| WO | WO2018207557 | A1 | 11/2018 |

* cited by examiner

F
29b
30
29a
1
30
10
3
2
4
9
11

TRANSMISSION ARRANGEMENT AND DRIVE TRAIN WITH SUCH A TRANSMISSION ARRANGEMENT

RELATED APPLICATIONS

This application claims the benefit of and right of priority under 35 U.S.C. § 119 to German Patent Application no. 10 2024 200 485.5, filed on 19 Jan. 2024, the contents of which are incorporated herein by reference in its entirety.

FIELD OF THE DISCLOSURE

The invention relates to a transmission arrangement for a drive train and to a drive train for a vehicle with such a transmission arrangement.

BACKGROUND

DE 10 2021 112 967 B3 discloses a lubricant supply system for a drive device of an electrically powered vehicle having at least one electric machine, wherein the electric machine drives at least one vehicle wheel via a transmission arrangement. An electrical machine hydraulic circuit is provided in which a lubricant tank is connected via a suction line to a pressure pump, which delivers lubricant to the electrical machine via an electrical machine supply line. Furthermore, a transmission hydraulic circuit is provided, via which lubricant can be conveyed to the transmission arrangement. The pressure pump is assigned as a common pressure pump to both the hydraulic circuit of the electric motor and the hydraulic circuit of the transmission, so that lubricant can be circulated in both the hydraulic circuit of the electric motor and the hydraulic circuit of the transmission when the pump is in operation. The electric machine hydraulic circuit and the transmission hydraulic circuit share a lubricant sump and a return pump as further common components. The transmission arrangement features an axle differential, the output side of which is connected to the vehicle wheels on both sides via flanged shafts in a drive-effective manner. Furthermore, one of the flanged shafts is divided into a wheel-side shaft section and an axle-side shaft section, which can be coupled to each other via a separating clutch. The lubricant supply system also comprises a disconnect clutch hydraulic circuit, via which the disconnect clutch can be supplied with lubricant. The lubricant can be fed to the disconnect coupling in at least one disconnect coupling supply line. Lubricant flowing from the breakaway coupling collects in the common lubricant sump.

SUMMARY

The purpose of the present invention is to provide a transmission arrangement with an improved coolant and lubricant supply, which in particular manages with fewer oil pressure bore holes in an internal center shaft to supply the components of transmission components that require cooling and lubrication. The problem is solved by a transmission arrangement with the features of independent claim 1 and by a drive train with the features of claim 10. Advantageous embodiments are the subject-matter of the dependent claims, the following description, and the figures.

A transmission arrangement according to the invention for a drive train of a vehicle comprises a planetary wheel set with a planetary carrier on which at least one bolt is arranged, wherein a first bearing element for rotatably mounting a planetary wheel is arranged on the bolt, wherein the transmission arrangement further comprises a differential which is operatively connected to the planetary carrier and transmits a drive power acting on the planetary carrier to a first center shaft and to a second center shaft arranged coaxially thereto, wherein at least the first center shaft comprises a centric first channel for coolant and/or lubricant supply for an interior space of the differential, at least one first bore hole, which extends radially at least in some sections, being formed on the planetary carrier in order to guide the coolant and/or lubricant out of the interior space of the differential into a second channel of the bolt.

Due to diameter limitations of the drive unit of the drive train, which is particularly designed as an electric motor, or other limiting structures of the drive train, an increase in the diameter of the center shafts is not possible at will in order to compensate for the increased stress concentration at the center shaft's cross bore holes. With the transmission arrangement proposed here, however, a reduction of cross bore holes for pressurized oil on the first center shaft can be achieved, because the coolant and lubricant supply can be routed through the differential, the interior of which is flooded via the first channel of the first center shaft. A certain amount of coolant or lubricant is therefore collected in the differential and from there it is distributed and in particular passed on to the bearings and sets of wheel teeth of the planetary wheel set.

The planetary wheel set includes, in addition to the planetary carrier and at least one planetary wheel, a sun wheel and a ring wheel, with the planetary wheel meshing with the sun wheel and the ring wheel. A "planetary wheel set" is to be understood in particular as a unit with a sun wheel, a ring wheel, and with several planetary wheels guided by a planetary carrier on an orbit around the sun wheel. It is advantageous if the respective planetary wheel set has exactly one stand translation ratio. While the planetary carrier forms the output component of the planetary wheel set, the planetary wheel set can be driven via the sun wheel or the ring wheel, while the other component is preferably arranged fixed to the housing and thus non-rotatable. In one exemplary embodiment, the sun wheel is operatively connected to a drive unit, such as an electric machine or an internal combustion engine, and the ring wheel is fixed. The planetary wheel set converts the input drive power and drives the differential housing of the differential. The planetary wheel set is part of a planetary transmission, which may also include other planetary wheel sets.

In addition to the differential housing, the differential includes an axle in the form of a bolt or a shaft with a circular cross-section. The axle is fixed in the differential housing, with at least one spur wheel, preferably two spur wheels, being rotatably arranged on the axle. Both spur wheels mesh with a first axle gear wheel, which is connected to the first center shaft in a rotationally fixed manner, and a second axle gear wheel, which is connected to the second center shaft in a rotationally fixed manner. The torsionally rigid connection is preferably achieved by means of a splined connection. The center shafts are to be understood as output shafts of the drive train, via which the wheels of the vehicle axle can be driven. The center shafts are therefore designed to be connected, at least indirectly, to a corresponding wheel of the vehicle in a drive-effective manner.

The planetary wheel set and the differential form a geometric unit. This means that parts of the planetary carrier can take over the functions of the differential, in particular the differential housing, and/or parts of the planetary carrier can take over the functions of the differential. Accordingly, the differential housing rotates with the planetary carrier.

When the planetary carrier and differential housing rotate around their rotational axis, the spur wheels also move around the rotational axis of the planetary carrier. The spur wheels can also rotate around their own axis, i.e., around the longitudinal axis of the small axis. The spur wheels ensure that the wheel axles can rotate at different speeds, while the torque and the rotary motion continue to be transmitted to the components connected to the wheel axles or center shafts, in particular the wheels of the vehicle.

When the vehicle is driving in a straight line, the force acts equally on both wheels of the vehicle axle, so the spur wheels do not rotate on their own axis, as they rotate with the differential housing. They transfer the torque to the axle gear wheels, causing them to turn and thus indirectly drive the wheels. When the vehicle turns a corner, however, the spur wheels rotate both forward, but at different speeds, due to the different speeds of the wheel axles or center shafts. The speed difference between the axle gear wheels is inversely proportional. The differential can be designed as a limited-slip differential in a further training course, wherein the differential can comprise corresponding coupling elements to couple the center shafts to one another.

The first channel, which is preferably located on the axis of rotation of the first center shaft, is designed to be fluidically connected to a coolant and/or lubricant supply. Coolant or lubricant is thus conveyed at least indirectly into the first channel by means of a pump and introduced into the transmission arrangement via the first channel, namely into the interior of the differential, wherein the coolant or lubricant is distributed from the interior of the differential to the components of the planetary wheel set to be cooled or lubricated. The interior of the differential is the space bounded by the spur wheels, the axle gear wheels and the front sides of the center shafts. The axle of the differential extends through the interior of the differential. The entire coolant or lubricant is collected in the interior and distributed outwards to the sets of wheel teeth and bearing elements of the transmission arrangement, in particular the planetary wheel set, with the help of the acting centrifugal forces.

The first bore hole is arranged on the planetary carrier in such a way that coolant or lubricant can be collected from the interior of the differential and guided to the second channel of the bolt, wherein the second channel guides the coolant or lubricant to the first bearing element, which rotatably supports the planetary wheel. The second channel can have axial and radial sections, depending on where the first bore hole opens into the second channel. The first bore hole at least has a radial component, so the first bore hole is to be understood as a cross-bore hole. This is to be understood by the expression “at least partially radially extending”. The first bore hole may have an additional axial component, so that the first bore hole may also be designed as a slanted bore bole, at least in sections. The first bore hole may also have axially extending sections, although the coolant or lubricant is always directed radially outwards. Accordingly, an optional section is set up to receive coolant or lubricant from a radial section of the first bore hole and/or to deliver it to a radial section of the first bore hole.

Since the differential and the planetary carrier function as a geometric unit in this design, all of the oil that collects in the differential can escape through at least the first bore hole in the planetary carrier and thus reaches the bearing elements and sets of wheel teeth that need to be cooled and lubricated.

The first center shaft is arranged radially within the planetary wheel set. The first center shaft is arranged coaxially with the longitudinal axis of the planetary wheel set. The first center shaft is radially arranged within a sun wheel and an input shaft of the transmission arrangement. The input shaft is designed to conduct a drive power from a drive unit into the transmission arrangement. The first center shaft is arranged radially within the planetary carrier.

The planetary carrier preferably has an axial section on which a sun wheel of the planetary wheel set is rotatably mounted via at least a second bearing element. The axial section of the planetary carrier can be arranged in sections radially between the first center shaft and the first sun wheel.

Preferably, at least one second bore hole extending radially at least in sections is formed on the axial section of the planetary carrier in order to supply the second bearing element with coolant and/or lubricant. The second bearing element can be a radial bearing, in particular a needle bearing or slide bearing. Radial forces are transmitted between two components by means of the radial bearing. A needle bearing or sleeve bearing saves radial space. The second bearing element is preferably arranged radially between the axial section of the planetary carrier and the sun wheel. The second bearing element and the second bore hole can be in a common radially extending plane. In other words, the second bearing element and the second bore hole are arranged at the same axial position.

Furthermore, at least one third bore hole, which extends radially at least in sections, is preferably formed on the axial section of the planetary carrier in order to supply a third bearing element, for mounting the sun wheel on the planetary carrier, with coolant and/or lubricant. The third bearing element is preferably a thrust bearing, in particular a cylindrical roller bearing. Axial forces can be transmitted between two components by means of a thrust bearing.

The third bore hole is preferably designed to supply a first set of wheel teeth between the sun wheel and the planetary wheel of the planetary wheel set with coolant and/or lubricant. Consequently, the third bore hole is used to lubricate and cool the third bearing element and the first set of wheel teeth between the sun wheel and the planetary wheel of the planetary wheel set.

In one exemplary embodiment, the second bore bole and/or the third bore hole is/are fluidically connected to the interior of the differential via a splined connection between the first center shaft and a first axle gear wheel of the differential that meshes with it. In other words, some of the coolant or lubricant is fed from the interior of the differential via the splined connection, which connects the first center shaft to the first axle gear wheel in a rotationally fixed manner, to the axial section of the planetary carrier, where it can be distributed further via the second or third bore hole. Depending on the direction of the torque, gaps form on the tooth flanks of the splined connection during operation of the drive train. These gaps allow the coolant or lubricant to pass from one end to the other of the splined connection. Optionally, individual teeth of the internal set of wheel teeth of the first axle gear wheel and/or the external set of wheel teeth of the first center shaft can be missing at the splined connection in order to be able to feed a desired coolant or lubricant volume to the required location.

The first bore hole of the planetary carrier is preferably connected fluidically to the interior of the differential via the second set of wheel teeth between a first spur wheel of the differential and a first axle gear wheel of the differential that meshes with it. In other words, some of the coolant or lubricant is fed from the interior of the differential via the second set of wheel teeth to the first bore hole, from where it reaches the second channel of the bolt.

In a further development of the invention, a perforated end panel is arranged in the first channel of the first center shaft. The end panel defines the amount of coolant or lubricant entering the interior. In other words, exactly the right amount of coolant or lubricant enters the interior of the differential to lubricate or cool the components or sets of wheel teeth. This can help to avoid or at least reduce losses, in particular splashing losses or the like. The end panel may have perforations or holes that help regulate pressure in the first channel.

Preferably, the first center shaft has at least one cross bore hole. The cross-bore hole allows coolant or lubricant to be diverted radially outwards before it enters the interior, in order to cool or lubricate components of the planetary wheel set. The cross-bore hole of the first center shaft may be configured to supply coolant or lubricant to the second and/or third bore holes on the axial section of the planetary carrier. In this case, the coolant or lubricant does not have to be routed via the interior, but can be directed directly to the desired location, provided that the respective cross bore hole does not have a negative effect on the load-bearing properties of the comparatively slender first center shaft. Accordingly, it is also conceivable to provide more than one cross bore hole on the first center shaft.

A drive train for a vehicle according to the invention comprises a transmission arrangement as previously described and a drive unit. The drive train can be used in one vehicle. The vehicle is preferably a motor vehicle, in particular an automobile (e.g., a passenger car weighing less than 3.5 tons), bus or truck (e.g., a bus or truck weighing more than 3.5 tons) In particular, the vehicle is an electric or hybrid vehicle. The vehicle has at least two axles, one of which forms a driven axle that can be driven by means of the drive train. The drive train according to the invention is effectively arranged on this drivable axle, wherein the drive tram transmits a drive power of the drive unit via the transmission arrangement at least indirectly to the wheels of this axle. It is also conceivable to provide such a drive train for each axis. The drive train is preferably installed in a front-transverse design, so that the drive shaft of the drive unit and the input shaft of the transmission arrangement are essentially aligned transversely to the longitudinal direction of the vehicle. Alternatively, the drive train may be arranged at an angle to the longitudinal and transverse axes of the vehicle, with the output shafts connected via appropriate joints to the wheels of the respective axles, which are arranged transversely to the vehicle's longitudinal axis.

In this context, the term "at least indirectly" means that two components are connected to each other (operatively) via at least one other component that is arranged between the two components, or that they are directly and thus immediately connected to each other. Furthermore, additional components can be arranged between shafts or gear wheels, which are effectively connected to the shaft or gear wheel.

A "drive-effective connection" between components means that these components are either directly connected to each other, for example in a torsionally rigid manner, or indirectly connected to each other via at least one further component, for example via at least one further shaft and/or at least one further gear wheel.

The above definitions and explanations regarding technical effects, advantages and advantageous embodiments of the transmission arrangement according to the invention also apply, mutatis mutandis, to the drive train according to the invention, and vice versa.

BRIEF DESCRIPTION OF THE DRAWINGS

In the following, an exemplary embodiment of the invention is explained in more detail using the schematic drawings, where the same or similar components are provided with the same reference. The figures show.

DETAILED DESCRIPTION

Figure 1:
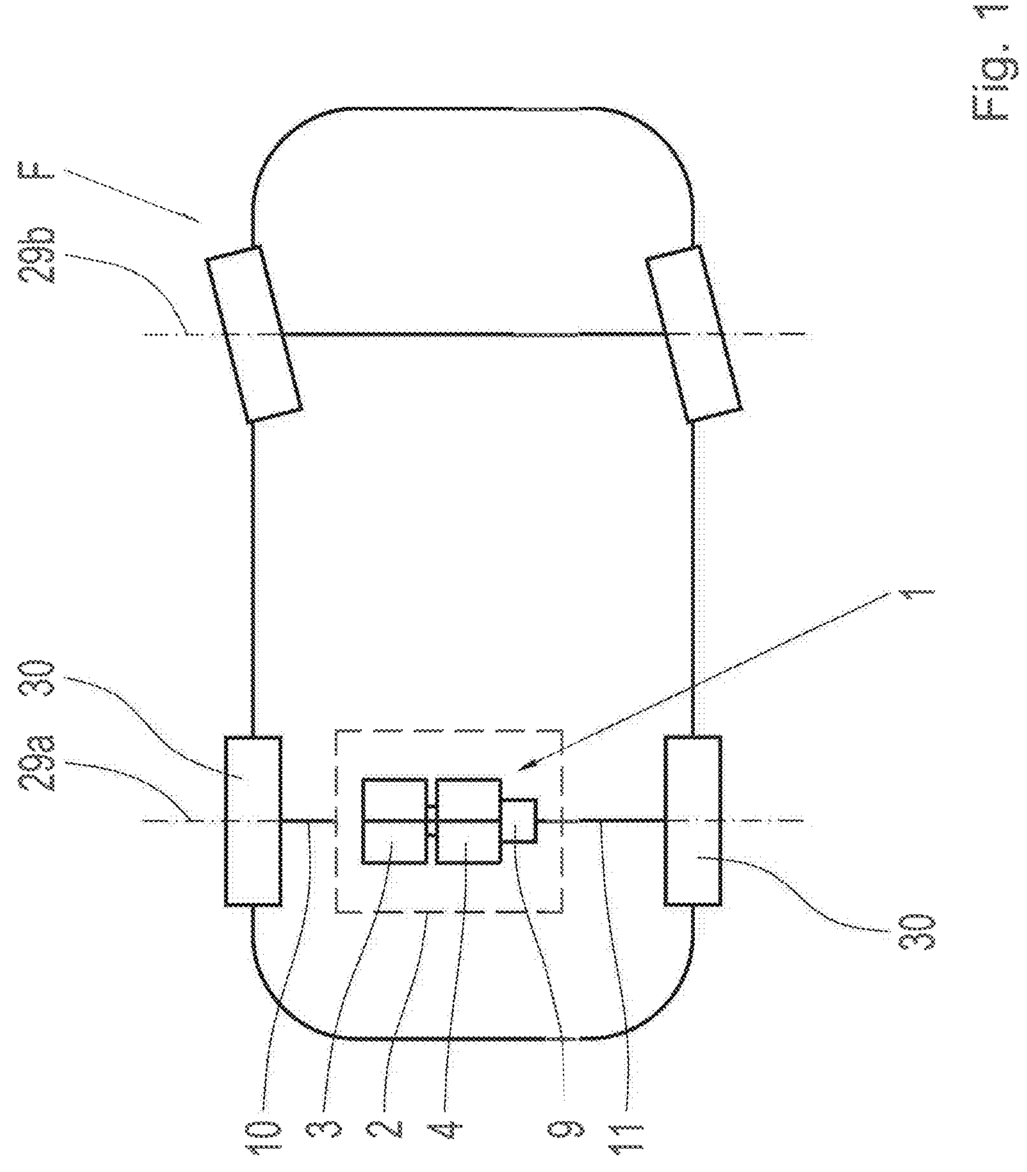
FIG. 1: a highly schematic top view of a vehicle with a drive train and a transmission arrangement according to the invention, according to a preferred embodiment.

FIG. 1 shows a vehicle F with two vehicle axles 29*a*, 29*b*, wherein a drive tram 2 according to the invention is arranged on the first vehicle axle 29*a* in a drive-effective manner, that is, to drive wheels 30 of the vehicle F. Vehicle F is an electric vehicle, wherein the drive of vehicle F is purely electric. The first vehicle axle 29*a* can be both the front axle and the rear axle of the vehicle F and forms a driven vehicle axle of the vehicle F. In this case, the first vehicle axle 29*a* is the non-steerable rear axle of the vehicle F.

Figure 2:
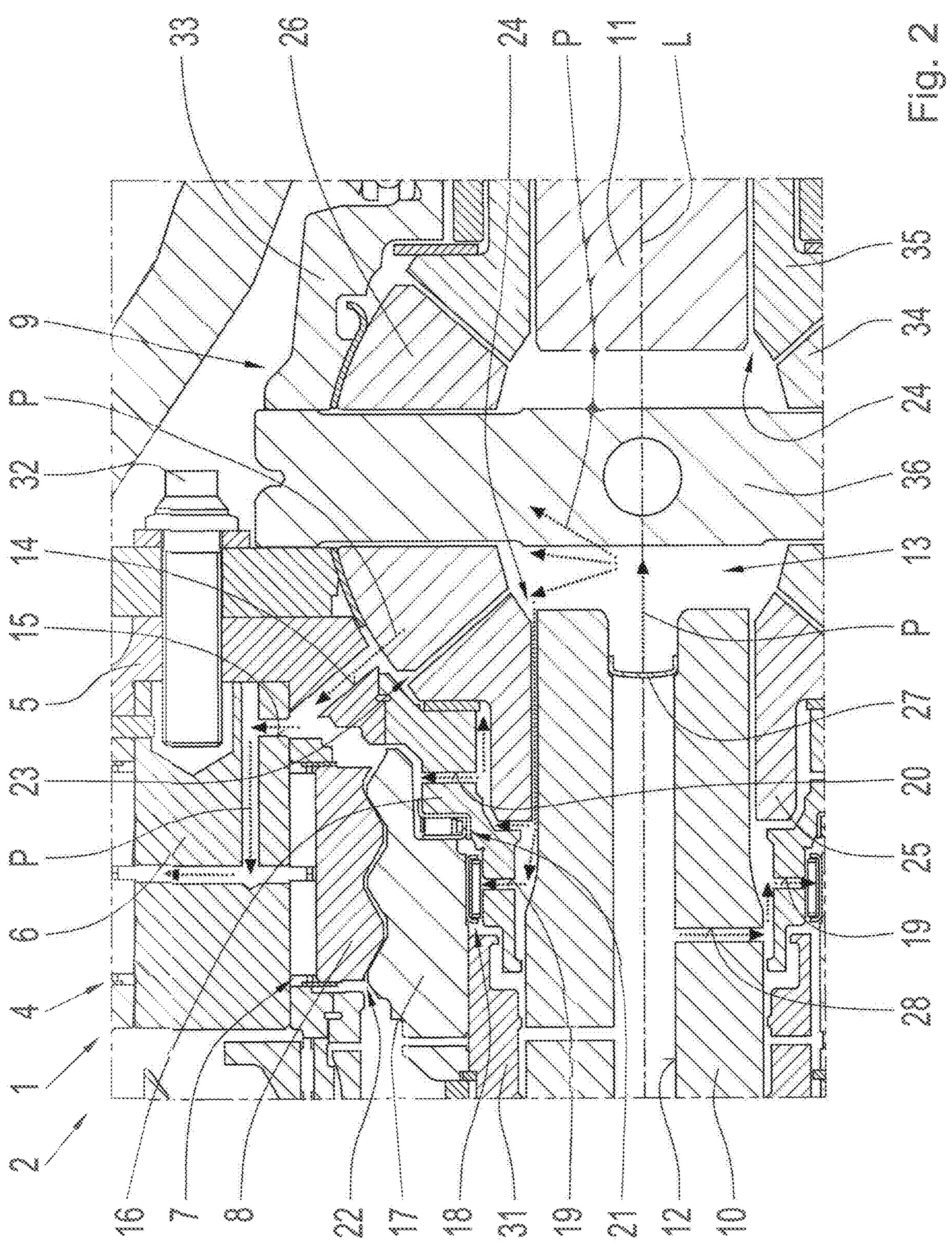
FIG. 2: a greatly simplified longitudinal section of the partially shown transmission arrangement according to the invention, as shown in FIG. 1.

The drive train 2 comprises, according to FIG. 1 in combination with FIG. 2, a transmission arrangement 1, wherein a drive power of a drive unit 3 configured as an electric machine is transmitted via the transmission arrangement 1 to a differential 9 which divides the drive power between a first center shaft 10 and a second center shaft 11. The center shafts 10, 11 serve as output shafts of the drive train 2 and are each connected to the aforementioned wheel 30 of the first vehicle axle 29*a*.

The transmission arrangement 1 comprises a planetary wheel set 4 having a sun wheel 17 that can be driven in rotation by an input shaft 31 and acts as the drive part of the planetary wheel set 4, a planetary carrier 5 acting as the output part of the planetary wheel set 4 and a ring wheel (not shown here), which is fixed, i.e., non-rotatably, arranged. The input shaft 31 is operatively connected to the drive unit 3 according to FIG. 1. On the planetary carrier 5, bolts 6 are fastened, on each of which a first bearing element 7 is arranged for the rotatable mounting of an associated planetary wheel 8.

The differential 9, which is operatively connected to the planetary carrier 5, has a differential housing 33 which is firmly connected to the planetary carrier 5 by screws 32 and to which an axle 36 is attached, with spur wheels 26, 34 arranged on it such that they can rotate and are spaced apart. The spur wheels 26, 34 mesh with two axle gear wheels 25, 35, which are each connected to one of the coaxially arranged center shafts 10, 11 in a rotationally fixed manner via a splined connection 24. A drive power converted by means of the planetary wheel set 4 is distributed to the two center shafts 10, 11 via the planetary carrier 5 and the differential components 9.

The first center shaft 10 has a centric first channel 12, via which a coolant and/or lubricant supply, for example in the form of a pump, which is not shown here, delivers coolant or lubricant to an interior 13 of the differential 9. A perforated end panel 27 is arranged in the first channel 12, wherein a defined amount of coolant or lubricant per unit of time enters the interior 13 of the differential 9.

The planetary carrier 5 has an axial section 16 on which a son wheel 17 of the planetary wheel set 4 is rotatably mounted and radially supported via a second bearing element 18 designed as a needle bearing. The sun wheel 17 is also supported axially on the planetary carrier 5 and rotatably in relation to it by means of a third bearing element 21 designed as a cylindrical roller bearing.

The coolant or lubricant is pumped from the interior 13 to the outside to cool and lubricate the bearing elements and sets of wheel teeth of the transmission arrangement 1, in particular the planetary wheel set 4. The direction of flow of the coolant or lubricant is illustrated by the dotted arrows P. On planetary carrier 5, several at least partially radially extending bore holes 14, 19, 20 are provided. In this example, the first bore hole 14 is designed at an angle to the longitudinal axis L, of the planetary wheel set 4 and to the axis of rotation of the center shafts 10, 11, in order to guide some of the coolant or lubricant out of the interior 13 of the differential 9 and into a second channel 15 of the bolt 6. In the present case, the first bore hole 14 leads directly into the second channel 15 in order to supply the first bearing element 7 with coolant or lubricant.

A second and third bore hole 19, 20 are also formed on the axial section 16 of the planetary carrier 5, which extend essentially radially. The second bearing element 18 is supplied with coolant or lubricant via the second bore hole 19. The third bore hole 20 supplies the third bearing element 21 and a first set of wheel teeth 22 between the sun wheel 17 and the planetary wheel 8 with coolant and lubricant. Furthermore, the first center shaft 10 has at least one cross bore hole 28 to supply the second bearing element 18 with coolant or lubricant. The first center shaft 10 can have further cross bore holes for the supply of coolant or lubricant to components of the transmission arrangement 1, which will not be discussed in more detail here.

Part of the coolant or lubricant passes from the interior 13 of the differential 9 via a second set of wheel teeth 23 between the first spur wheel 26 of the differential 9 and the first axle gear wheel 25 meshing with it to the first bore hole 14. Another part of the coolant or lubricant passes from the interior 13 of the differential 9 via the splined connection 24 between the first center shaft 10 and the first axle gear wheel 25 meshing with it to the second and third bore hole 19, 20.

REFERENCE NUMBERS

1 Transmission arrangement
2 Drive train
3 Drive mechanism
4 Planetary wheel set
5 Planetary carrier of the planetary wheel set
6 Bolts
7 First bearing element
8 Planetary wheel
9 Differential
10 First center shaft
11 Second center shaft
12 First channel
13 Interior of differential
14 First bore hole
15 Second channel
16 Axial section of the planetary carrier
17 Sun wheel of the planetary wheel set
18 Second bearing element
19 Second bore hole
20 Third bore hole
21 Third bearing element
22 First set of wheel teeth
23 Second set of wheel teeth
24 Splined connection
25 First axle gear wheel of the differential
26 First spur wheel of the differential
27 End panel
28 Cross bore hole
**29*a*** First vehicle axle
**29*b*** Second vehicle axle
30 Wheel
31 Input shaft
32 Screw
33 Differential housing
34 Second spur wheel of the differential
35 Second axle gear wheel of the differential
36 Axis
F Vehicle
L Longitudinal axis
P Arrow

The invention claimed is:

1. A transmission arrangement for a drive train of a vehicle, comprising:
- a planetary wheel set having a planetary carrier on which at least one bolt is arranged;
- a first bearing element configured for rotatably mounting a planetary wheel, the first bearing element being arranged on the at least one bolt; and
- a differential operatively connected to the planetary carrier and arranged to transmit a drive power acting on the planetary carrier to a first center shaft and to a second center shaft arranged coaxially thereto,
- wherein at least the first center shaft defines a central first channel for supplying coolant and/or lubricant supply to an interior of the differential and defines at least one first bore hole, which extends radially at least in some sections, the at least one first bore hole being formed on the planetary carrier and configured to guide the coolant and/or lubricant out of the interior of the differential into a second channel of the bolt.

2. The transmission arrangement according to claim 1, wherein the planetary carrier has an axial portion on which a sun wheel of the planetary wheel set is rotatably mounted by way of at least one second bearing element.

3. The transmission arrangement according to claim 2, wherein at least one second bore hole, which extends radially at least in sections, is formed on the axial section of the planetary carrier and configured to supply the second bearing element with coolant and/or lubricant.

4. The transmission arrangement according to claim 1, wherein the axial section of the planetary carrier defines at least one third bore hole, which extends radially at least in sections, and is configured to supply a third bearing element, for mounting the sun wheel on the planetary carrier, with coolant and/or lubricant.

5. The transmission arrangement according to claim 4, wherein the at least one third bore hole is further configured to supply a first set of wheel teeth between the sun wheel and the planetary wheel of the planetary wheel set with coolant and/or lubricant.

6. The transmission arrangement according to claim 4, wherein the at least one second bore hole and/or at least one the third bore hole is fluidically connected to the interior of the differential via a splined connection between the first center shaft and a first axle gear wheel of the differential meshing therewith.

7. The transmission arrangement according to one claim 1, wherein the at least one first bore hole of the planetary carrier is fluidically connected to the interior of the differential via a second set of wheel teeth between a first spur wheel of the differential and a first axle gear wheel of the differential meshing therewith.

8. The transmission arrangement according to claim 1, comprising:

a perforated end panel in the first channel of the first center shaft.

9. The transmission arrangement according to claim 1, wherein the first center shaft has at least one cross bore hole.

10. A drive train for a vehicle, comprising a drive unit and the transmission arrangement according to claim 1.

* * * * *